Dec. 6, 1955
J. H. WEAVING ET AL
2,726,307
MANUFACTURE OF TURBINE BLADE
Filed Jan. 21, 1953
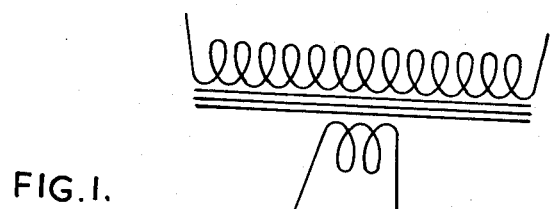
FIG. 1.
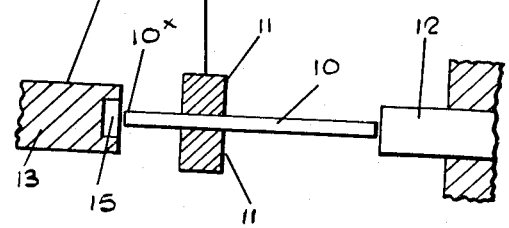
FIG. 2.
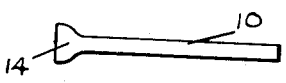
FIG. 3.
FIG. 4.     FIG. 5.
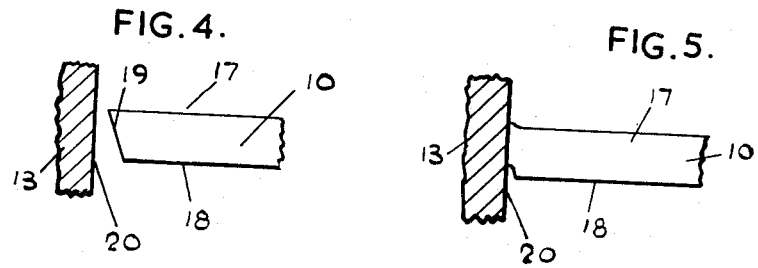
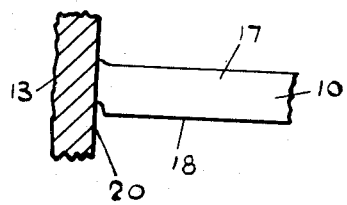
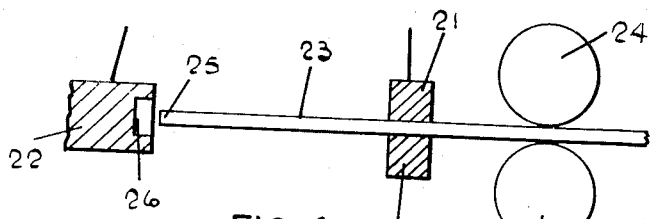
FIG. 6.
Inventor
John H. Weaving
Richard Weck
By
Scrivener & Parker
Attorney

United States Patent Office 2,726,307
Patented Dec. 6, 1955

2,726,307

MANUFACTURE OF TURBINE BLADE

John H. Weaving, Moseley, Birmingham, and Richard Weck, Cambridge, England, assignors to The Austin Motor Company Limited, Birmingham, England Application January 21, 1953, Serial No. 332,412

2 Claims. (Cl. 219—3)

This invention relates to the manufacture of turbine blades, and more particularly to the production of turbine rotor blades which require to be fixed by their root ends to the rotor body.

It is very difficult to form rotor blades, especially those for gas turbines, integrally with the rotor owing to the restricted space available between blades for the machining operations, and it is therefore usual to form the blades separately, but this method also is difficult and expensive owing to the intricate cross-sectional shape of the blade which hitherto has usually been produced by extremely accurate profiling or machining operations upon a rough blade blank including a root portion at one end for fixing to the rotor body.

According to the present invention, a turbine rotor blade is produced from a metal strip having throughout its length a uniform cross-section corresponding to that of the blade proper, by electrically upsetting an end portion of said strip to form a blade base portion of greater cross-section than the blade proper, and then shaping said blade base portion to the blade root form required for attaching it to a turbine rotor.

A blade may be produced by forming a metal strip to suitable length and submitting said length to the process of electrically upsetting one end portion thereof, or alternatively a blade may be formed from a portion of a length of metal strip which portion is severed from the length of metal strip subsequent to submitting an end portion of said length to the process of electrically upsetting one end thereof.

The blade base portion formed at one end of the strip by the electrically upsetting process may be forged so as to produce therein the approximate root form required, and then machined to complete its formation ready for attachment to a turbine rotor.

The invention will now be further described with reference to the accompanying drawings, in which:

Fig. 1 is a diagram illustrating one method of manufacturing a turbine blade.

Fig. 2 is a diagram illustrating the form of a blade at a stage of its manufacture.

Fig. 3 is a diagram illustrating the form of the blade shown in Fig. 2 at a later stage of its manufacture.

Figs. 4 and 5 are detail views illustrating a special step in the manufacturing process.

Fig. 6 is a similar diagram to Fig. 1, illustrating a modified process.

Referring to Fig. 1 of the drawings, a turbine blade is produced from a pre-determined length of metal strip indicated at 10. The said strip 10 is illustrated in edge-on view, and it will be understood that throughout its length it is of a uniform cross-section, corresponding to that of the blade proper in a finished blade, e. g. the strip may be of uniform aerofoil or like section, and preferably consists of a predetermined length cut from rolled strip stock of appropriate material.

The electrical upsetting of an end portion of the metal strip 10 consists of mounting the strip 10 between the elements 11 of a two-part heavy copper primary electrode, the two parts 11 being so constructed and loaded as to clamp the strip 10 with sufficient lateral pressure as to ensure good electrical contact, and yet permit the strip 10 to be slidably forced lengthwise between them by means of a ram 12 adapted to exert pressure at one end of the strip 10, as shown, to force the other end $10^x$ thereof into end-on engagement with a secondary electrode 13. The electrical resistance at the point of contact between the strip 10 and the secondary electrode 13 causes the leading end $10^x$ of the strip to become hot, and said heating effect together with the applied endwise pressure causes the end portion of the strip in contact with the secondary electrode to be formed into a blob of metal. Thus one end portion of the strip 10 is electrically upset, and the blob thereby produced affords a blade base portion 14 (Fig. 2) of greater cross-section than remainder of the strip 10, which remainder affords the blade proper.

In Fig. 1 the contact face of the secondary electrode 13 is recessed at 15 to form a cavity which assists, in obvious manner, in the process of electrically upsetting the end portion of the strip 10, and the formation thereby of the blade base portion 14.

Subsequently the blade base portion 14 is forged to produce therein the approximate root form required, and is then machined to complete its formation ready for attachment to a turbine rotor. In this connection, in Fig. 3 the blade base portion 14 is shown as having been forged and machined to form buttress or "fir tree" keys 16 for engaging complementary keyways in a peripheral groove in a turbine rotor (not shown).

If the leading end $10^x$ of the strip 10 of aerofoil or like section is formed with its end face cut square, i. e. at right angles to its length, and this end face is brought into full face engagement with the contact face of the secondary electrode 13, the tendency will be for a very irregular and unsuitably shaped blob to be formed, due to the relatively rapid heating up and deformation of the narrower part of the aerofoil section as compared with the thicker part.

A method of overcoming this difficulty is illustrated in Figs. 4 and 5. The strip 10 is shown in side-face view, 17 being the thicker edge of the aerofoil section (not shown) and 18 being the thinner edge. The end face 19 (Fig. 4) is cut obliquely, so that the said end face 19 is disposed at an angle to the contact face 20 of the secondary electrode 13. Thus when the strip is forced into end-on engagement with said electrode, the thicker part of the cross-section at the edge 17 contacts the electrode 13 first, and metal from this thicker part becomes heated and displaced toward the thinner edge 18, until by the time the strip has advanced and made full face contact with the electrode the desired blob of metal has commenced to form and has effected a considerable thickening of the thin edge 18 before the latter can make contact with the electrode as illustrated in Fig. 5. In this way a satisfactorily uniform blob, to afford a blade base portion, can be formed by electrically upsetting the end portion of the aerofoil section strip, with a consequent reduction of the amount of subsequent forging required.

This principle of causing the thicker part of the cross-section of the strip to engage the electrode face first, in order to obviate burning of a thinner part or parts of the section, may be applied to other sections than that just described. For example, the section of the strip may be thickest in the centre, and taper to both edges, in which case the end of the strip would be correspondingly shaped to cause the centre part to engage the electrode face first, as by forming said strip end to curved form, or to wedge shape.

The foregoing description covers the production of turbine blades each from a metal strip 10 somewhat longer than the overall length of the completed blade proper and base portion 14, the separate strips being severed from a length of strip stock of the requisite blade cross-section throughout.

The invention, however, also envisages the production of turbine rotor blades, in succession, from such a length of strip stock and such a method of production is illustrated in Fig. 6. Referring to that figure, 21 is the two-part primary electrode, and 22 the secondary electrode, both arranged and formed exactly as shown in Fig. 1, but spaced further apart. The length of strip stock 23 is however, forced through the primary electrode by means of a pair of feed rollers 24, until the end 25 of the length of strip 23 engages the contact face of the secondary electrode 22, in the recess 26 therein. Thus the leading end portion of the length of strip 23 is submitted to the electrical upsetting process to form the thicker blade base portion, and after said upsetting process the electrically upset end portion, together with an undeformed portion of the strip 23, is severed from the length of strip at a point between the primary electrode 21 and the secondary electrode 22.

This leaves the length of strip still clamped between the two-part primary electrode, and ready for feeding forward by the rollers 24, to commerce a further electrical upsetting proceess. Alternative feeding means to the rollers 24 could be employed.

It will be appreciated that the end remote from the base portion of each blade will require to be profiled or dressed to suit the designed clearance between a bladed rotor and its turbine stator casing.

Having fully described our invention, what we claim and desire to secure by Letters Patent is:

1. In the manufacture of turbine blades from strips of stock material having an aerofoil cross-sectional shape extending uniformly throughout their length, the method of forming an integral machinable foot on one end of each strip by the use of primary and secondary heating-and-upsetting electrodes comprising the steps of supporting the strip in slidable contact with the primary electrode and with the end face of said strip inclined at an angle to the face of the secondary electrode so that the thickest portion of said end face is nearest said electrode, advancing the strip until the portion of greatest thickness contacts the secondary electrode and is electrically heated, applying end-wise pressure to the strip until the heated metal of the thickest end portion is upset and a portion thereof is displaced in the direction of an adjacent portion of less thickness thereby thickening the same to withstand additional pressure without buckling or the like, continuing the pressure until the thinnest portion of the strip is thickened by displaced metal from an adjacent previously thickened portion, and thereafter continuing the pressure as necessary until a foot of substantially uniform dimensions has been formed on the end of said strip.

2. In the manufacture of a turbine blade from a strip of stock material having a thick longitudinal edge and a thin longitudinal edge defining an aerofoil cross-sectional shape extending uniformly throughout its length, the method of forming an integral machinable foot on one end of each strip by the use of primary and secondary heating-and-upsetting electrodes comprising the steps of cutting the end face of the strip along a straight slantwise line extending from edge to edge of the strip so that the thickest portion of the end face extends along the length of the strip beyond the thinnest portion of said face, supporting the strip in slidable contact with the primary electrode with the previously cut end face of said strip being inclined at an angle to the face of the secondary electrode so that the thickest portion of said end face is nearest said electrode, advancing the strip until said last named portion contacts the secondary electrode and is electrically heated, applying endwise pressure to the strip until the heated metal of said thickest portion starts to upset and a portion thereof is thereby displaced in the direction of an adjacent portion of less thickness thereby thickening the same to withstand additional pressure without buckling or the like, continuing the pressure until the thinnest portion of the face is thickened by displaced metal from the adjacent previously thickened portion, and thereafter continuing the pressure as necessary until a foot of substantially uniform dimensions has been formed on the end of said strip.

References Cited in the file of this patent

UNITED STATES PATENTS

| | | |
|---|---|---|
| 1,417,806 | De Lapotterie | May 30, 1922 |
| 2,473,245 | Hanna | June 14, 1949 |
| 2,638,663 | Bartlett et al. | May 19, 1953 |